US008433619B2

(12) United States Patent
Croes (10) Patent No.: US 8,433,619 B2
(45) Date of Patent: Apr. 30, 2013

(54) SYSTEM AND METHOD FOR PRODUCT REVIEW INFORMATION GENERATION AND MANAGEMENT

(75) Inventor: Victor Croes, Utrecht (NL)

(73) Assignee: eBay Inc., San Jose, CA (US)

( * ) Notice: Subject to any disclaimer, the term of this patent is extended or adjusted under 35 U.S.C. 154(b) by 1311 days.

(21) Appl. No.: 11/848,686

(22) Filed: Aug. 31, 2007

(65) Prior Publication Data

US 2009/0063288 A1 Mar. 5, 2009

(51) Int. Cl.
*G06Q 30/00* (2006.01)

(52) U.S. Cl.
USPC .......................................... 705/26.7; 705/27.1

(58) Field of Classification Search ................... 705/26, 705/27, 14, 14.19, 26.7, 27.1, 14.44
See application file for complete search history.

(56) References Cited

U.S. PATENT DOCUMENTS

| 6,029,195 | A  | * | 2/2000  | Herz ............................ | 725/116 |
| 7,689,557 | B2 | * | 3/2010  | Pandit et al. ................... | 707/771 |
| 2004/0230511 | A1 | * | 11/2004 | Kannan et al. ................. | 705/35 |
| 2005/0192958 | A1 | * | 9/2005  | Widjojo et al. .................. | 707/5 |
| 2005/0197946 | A1 | * | 9/2005  | Williams et al. ................ | 705/36 |
| 2005/0203804 | A1 | * | 9/2005  | Suzuki et al. ................... | 705/26 |
| 2006/0190329 | A1 | * | 8/2006  | Green et al. .................... | 705/14 |
| 2006/0277465 | A1 | * | 12/2006 | Pandit et al. ................... | 715/531 |
| 2007/0260520 | A1 | * | 11/2007 | Jha et al. ........................ | 705/14 |
| 2007/0265934 | A1 | * | 11/2007 | Hassman et al. ............... | 705/26 |
| 2008/0071602 | A1 | * | 3/2008  | Ojakaar et al. ................. | 705/10 |
| 2008/0109232 | A1 | * | 5/2008  | Musgrove et al. .............. | 705/1 |
| 2008/0154761 | A1 | * | 6/2008  | Flake et al. .................... | 705/37 |

OTHER PUBLICATIONS

Brett, Jennifer, "Bibbleman' wins date with a bid of $10,099": [Home Edition], The Atlanta Journal—Constitution, dated Sep. 25, 2004.*
"Gumtree.com Homepage" [online] [retrieved on Feb. 5, 2010] Retrieved from http://www.gumtree.com/, 2 pgs.

* cited by examiner

*Primary Examiner* — Mark Fadok
(74) *Attorney, Agent, or Firm* — Schwegman, Lundberg & Woessner, P.A.

(57) ABSTRACT

A computer-implemented system and method for product review information generation and management are disclosed. An example embodiment prompts a first user for entry of product review information associated with a product in a product category and with product attributes, stores the product review information, determines when a second user accesses product listings in the product category or with one or more of the product attributes, and presents the second user with the product review information.

12 Claims, 8 Drawing Sheets

SYSTEM AND METHOD FOR PRODUCT REVIEW INFORMATION GENERATION AND MANAGEMENT

BACKGROUND

1. Technical Field

This disclosure relates to methods and systems supporting online transactions by a user. More particularly, the present disclosure relates to product review information generation and management.

2. Related Art

Using conventional systems and processes on the Web, users can search for goods and services via the Internet and shop or make purchases of goods or services over the Internet. Well-known classifieds media and auction trading platforms typically allow sellers to place advertisements (ads) by filling in a form. In these so-called Sell-Your-Item forms, sellers describe the items that they wish to sell. In most cases, the information provided by sellers in their description of the item being offered for sale consists of two types of descriptive information: 1) Unique Item specifics. This type of information is perishable information related to the unique item for sale. This information is useless to other shoppers after the item sells (e.g. "The car is in good condition"); and 2) User review information. This type of product review information is non-perishable information related to the specific product type to which the unique item belongs. This information is useful to people even after the item sells. (e.g. "Next to its low fuel consumption, the Toyota Corolla is a practical car."). For most product sale listings, product information of both of these types is mixed in the sale item descriptions. As such, the value of the review information is lost and cannot be effectively used for other shoppers/buyers.

Thus, a system and method for product review information generation and management is needed.

BRIEF DESCRIPTION OF THE DRAWINGS

Embodiments illustrated by way of example and not limitation in the figures of the accompanying drawings, in which:

FIG. 5 illustrates an example of a related product listing for which the product review information provided by a seller of a related product can be made available to those who browse the listing.

DETAILED DESCRIPTION

A computer-implemented system and method for product review information generation and management are disclosed. In the following description, numerous specific details are set forth. However, it is understood that embodiments may be practiced without these specific details. In other instances, well-known processes, structures and techniques have not been shown in detail in order not to obscure the clarity of this description.

As described further below, according to various example embodiments of the disclosed subject matter described and claimed herein, there is provided a computer-implemented system and method for product review information generation and management. The system includes a review collector to obtain category-based product review information from a seller, and a review presenter to display related category-based product review information, product attribute information, and reviewer information in association with products or services in a related product/service category. Various embodiments are described below in connection with the figures provided herein.

Conventional Implementations

Figure 1:
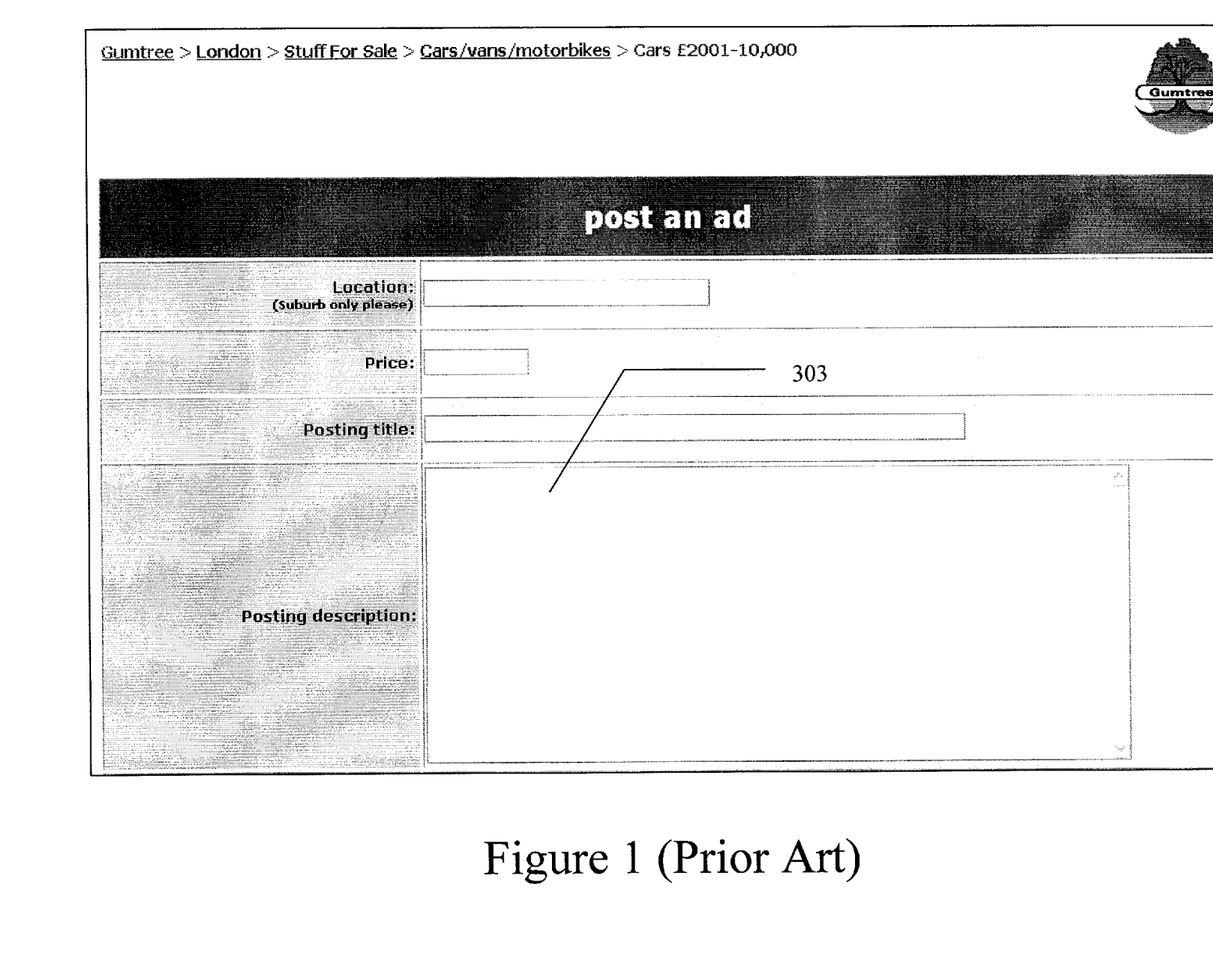
FIG. 1 illustrates an example of a well-known form used by sellers to place advertisements (ads).

Referring to FIG. 1, an example of a well-known form used by sellers to place advertisements (ads) is illustrated. Well-known classifieds media and auction trading platforms typically allow sellers to place ads by filling in a form such as the example form shown in FIG. 1. Sellers can use these forms to describe the items that they wish to sell. As shown in FIG. 1, a seller can describe the location, price, and posting title of the item in various data entry fields provided in the form. In block 303, the seller can provide a free-form textual description of the item for sale. In most cases, the information provided by sellers in their description of the item being offered for sale consists of two types of descriptive information: 1) Unique Item specifics. This type of information is perishable information related to the unique item for sale. The unique item specific information does not apply to other items in the same class of goods as the item offered for sale. This unique item specific information is useless to other shoppers after the item sells (e.g. "The car is in good condition" or "the car has minor damage on the left side"). The second type of descriptive information is: 2) User review information. This type of product review information is non-perishable information related to the specific product type to which the unique item belongs. The product review information does apply to other items in the same class of goods as the item offered for sale. This information is useful to people even after the item sells. (e.g. "Next to its low fuel consumption, the Toyota Corolla is a practical car" or "the Toyota Corolla handles well"). For most conventional product sale listings, product information of both of these types is mixed in the sale item descriptions.

Figure 2:
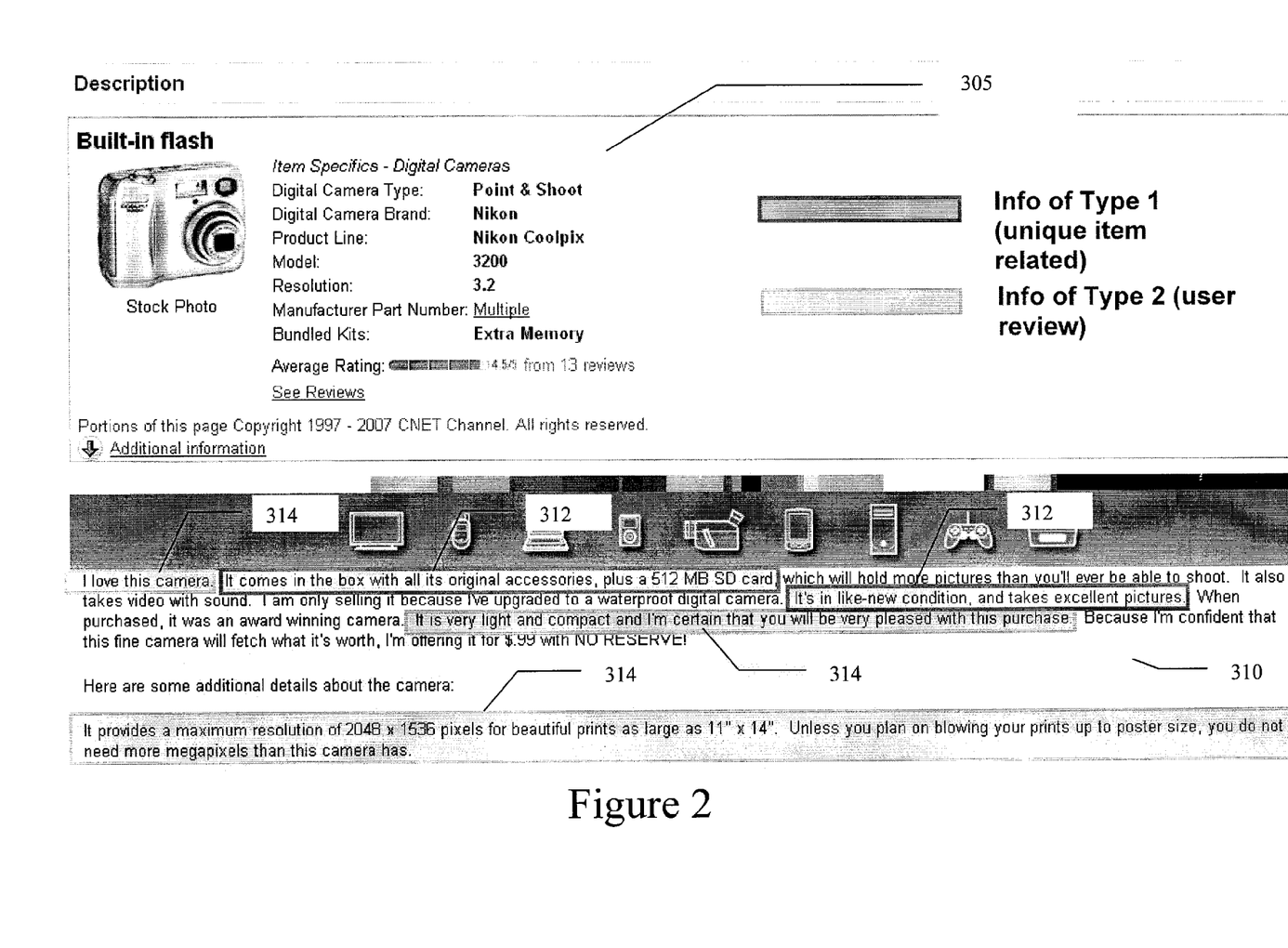
FIG. 2 illustrates an example of the mixing of two types of product information.

FIG. 2 illustrates an example of the mixing of these two types of product information. Referring to FIG. 2, a sample product listing is illustrated. The sample listing includes a set of product attributes 305 that describe the basic features of the product. Additionally, a product description section 310 provides a free-form textual description of the item for sale. As is typical in conventional systems, the product description section 310 includes a mix of the two types of product information described above. In particular, the description provided by the seller in product description section 310 includes portions that are unique item description information 312 and portions that are product review information 314. Unfortunately, these two types of information cannot be readily extracted from the product description section 310 for use in other items listings. As such, the value of the product review information 314 in product description section 310 is lost for subsequent shoppers or purchasers in the same or similar category of goods.

Description of Various Embodiments

Figure 3:
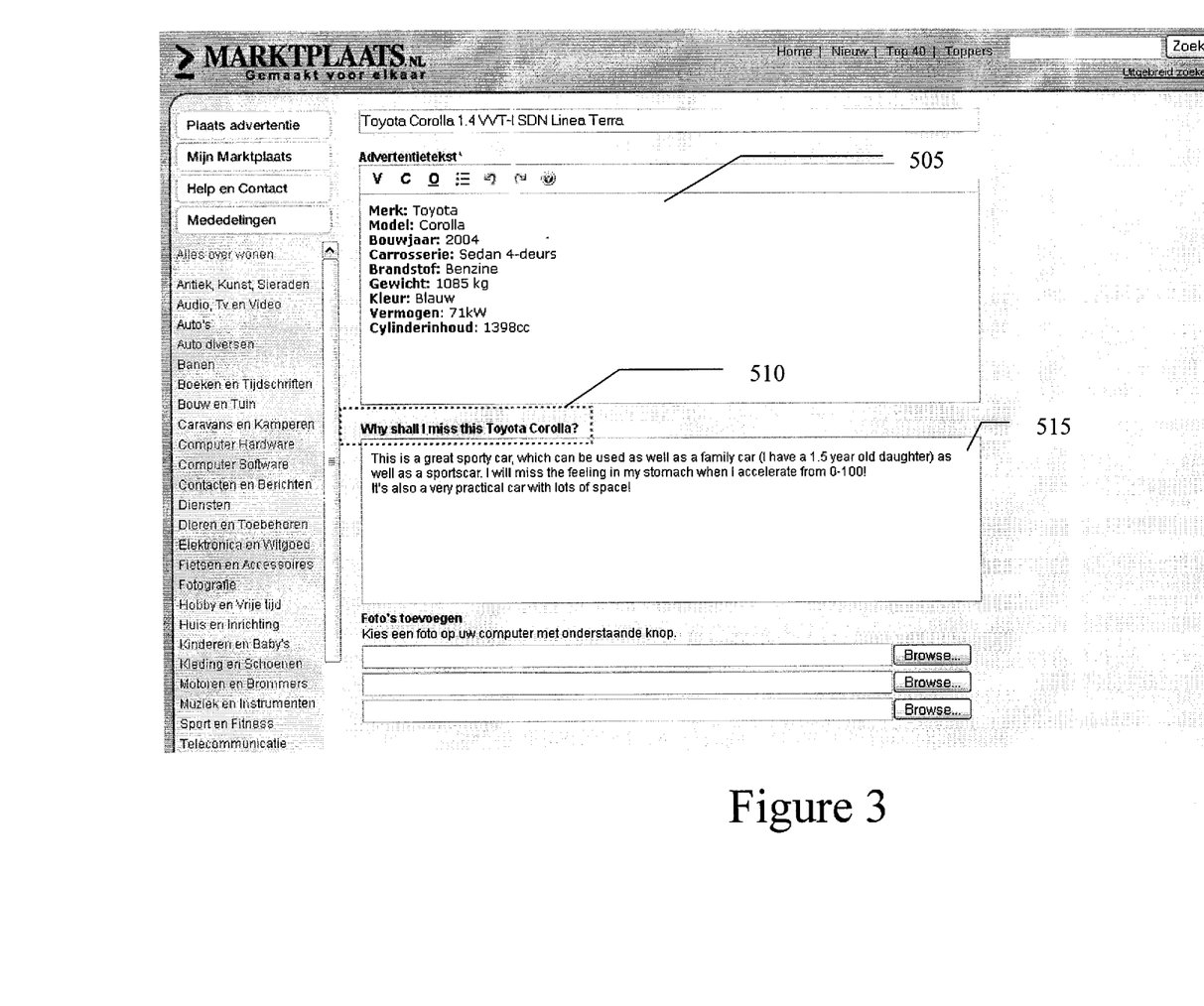
FIG. 3 illustrates an example of the product listing form provided in an example embodiment.

FIG. 3 illustrates an example of the product listing form provided in an example embodiment. As shown, the form includes a product/item attribute section 505 in which a seller can provide specific details of the features of the item offered for sale. The product attribute information can be used to categorize or classify the product listing into a set of hierarchical product categories. In the example of FIG. 3, the seller has identified the product as a 2004 Toyota Corolla 4-door sedan automobile. This product information can be used to associate the listing with an automobile products category by a specific manufacturer (e.g. Toyota) in a specific year (e.g. 2004) of a specific model (e.g. Corolla), etc. In this manner, the listing can be categorized and thereby related to other listings in the same or a similar product category. Similarly, the product attributes given by the seller who created the listing can be used to further classify the listing and relate the listing to other product listings having the same or similar attributes. For example, the sample product listing shown in FIG. 3 can be related to other product listings for 4-door sedans or other product listings for automobiles with engines that are less than 1400 cc's. Other product attributes of a particular product listing can be compared with and related to other product listings having the same or similar product attributes.

Referring still to FIG. 3, the example product listing form shown provides a seller query/prompt 510 intended to elicit a response from the seller that is likely to be primarily product review information and not likely to be item specific information. A product review response section 515 is provided to capture the seller response to the query/prompt 510. Because the seller query/prompt 510 is intended to elicit a response from the seller that is likely to be primarily product review information, the content of product review response section 515 is likely to be primarily product review information. As such, the content of product review response section 515 can be used by or beneficial to other shoppers or purchasers in the same or similar category of goods.

In an alternative embodiment, product review information can be solicited from a seller or review provider using various other information gathering channels, such as telephone calls, emails, faxes, mailings, electronic forms, surveys, and the like. The product review information contained in the correspondence received via these various channels can be collected into a central data repository for storage of the product review information.

Using the product category and product attribute information associated with the particular product listing, such as the product listing shown in FIG. 3, other related product listings can be found that match with or are similar to the category and product attributes of the particular product listing as described above. In this manner, clusters of related product listings in various dimensions can be generated and associated with a particular product listing. Each dimension of these related product listings can correspond to a particular category or attribute of the particular product listing. Having generated these clusters of related product listings in various dimensions, the content of product review response section 515 for the particular product listing can be associated with the other related product listings. In this manner, the product review information provided by a seller of a particular product item can be shown to other shoppers or buyers of other products in the same or similar product categories or with the same or similar product attributes.

Figure 4:
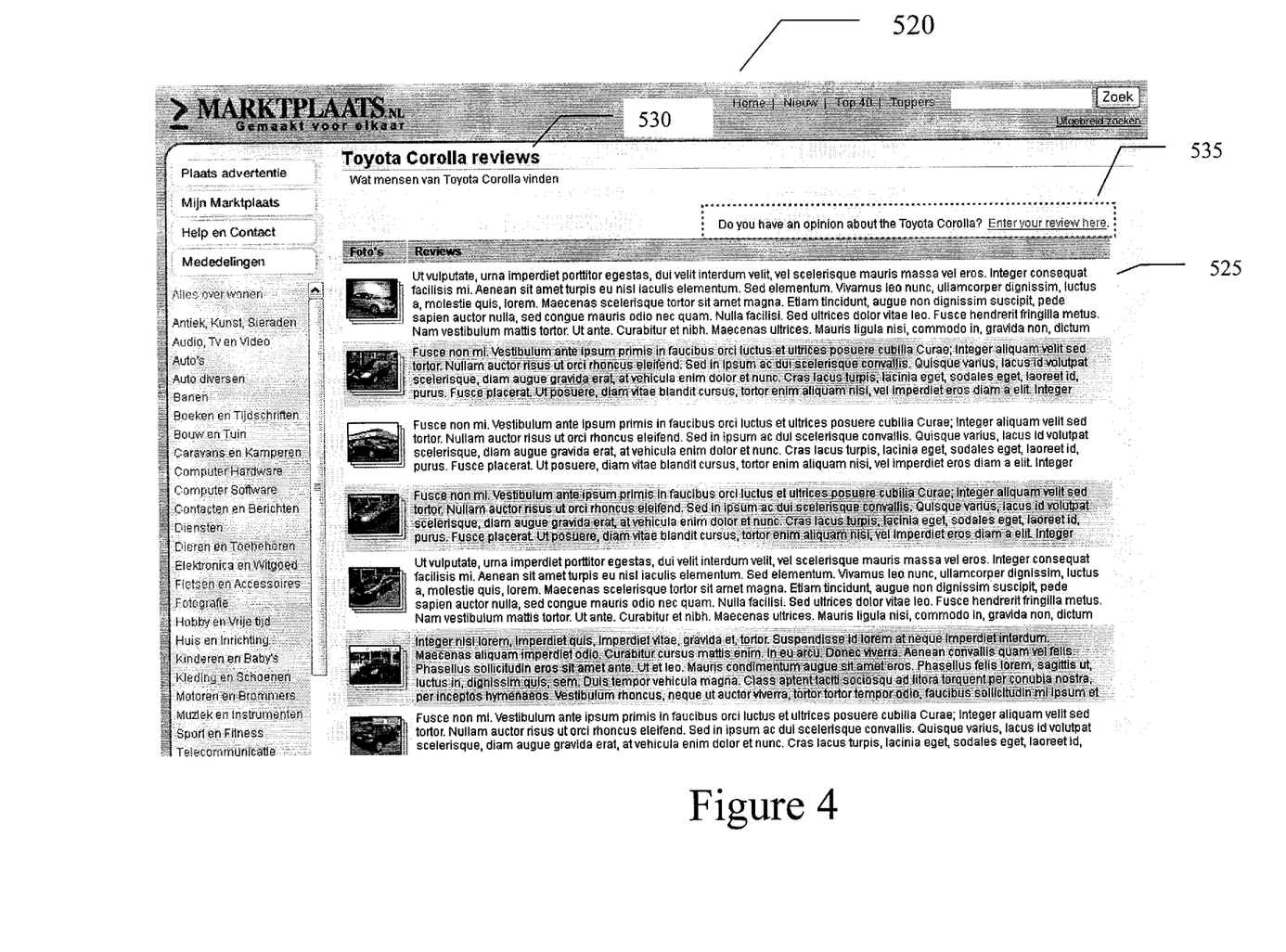
FIG. 4 illustrates an example of a set of related product listings for which the product review information provided by a seller of a related product can be made available to shoppers or potential buyers.

FIG. 4 illustrates an example of a set of related product listings for which the product review information provided by a seller of a related product can be made available to shoppers or potential buyers. In the particular example shown in FIG. 4, the set of related product listings 525 share category and product attribute dimensions. In this case, each listing in the set of listings 525 describes a Toyota Corolla automobile that is offered for sale. For each of these related listings, the seller associated with each individual listing may have provided product review information as described above. This product review information provided by each of these sellers would have been related to Toyota Corolla automobiles, in the particular example of FIG. 4. This product review information provided by each of these sellers can be presented to subsequent shoppers/buyers who browse listings of products in the same or similar product category or with the same or similar product attributes. In the particular example of FIG. 4, shoppers/buyers who browse listings of Toyota Corolla automobiles may also be presented with product review information related to Toyota Corolla automobiles. This product review information can include product reviews from a plurality of sellers of Toyota Corolla automobiles. In addition, a prompt 535 is presented to invite anyone browsing the listings 525 to add their own product review of products in the same or similar product category or with the same or similar product attributes. These additional user product reviews can be added to a database of previously stored product review information obtained from sellers of related products. In this manner, product category and product attribute-related product review information can be aggregated, stored, and later presented to shoppers/buyers who browse listings of related products.

FIG. 5 illustrates an example of a related product listing 550 for which the product review information provided by a seller of a related product can be made available to those who browse the listing 550. As shown, related product listing 550 is associated with a particular product category 552 and with particular product attributes 554 and 556. Additionally, a user who browses listing 550 can be shown product review information in a display region 560. The product review information in region 560 can be obtained from sellers of related products as described above. In the particular example of FIG. 5, sellers who placed ads offering a Toyota Corolla automobile for sale may have provided product review information on Toyota Corolla automobiles. This product review information originated by one or more sellers or other users can be displayed in region 560. As such, a user who browses listing 550 can be shown and thereby benefit from related product review information provided by other sellers/users.

In an alternative embodiment, the product review information originated by one or more sellers or other users and displayed to a user who browses a related listing can include information related to the particular seller or user who provided the product review information. For example, seller/user profile information, demographic information, location information, seller affiliation information, and the like can be included with the seller/user product review information in order to provide context for the particular product review. In this manner, a shopper/buyer who is presented with product review information can learn something about the reviewer and thus determine if the reviewer may have a particular perspective on the product.

Figure 6:
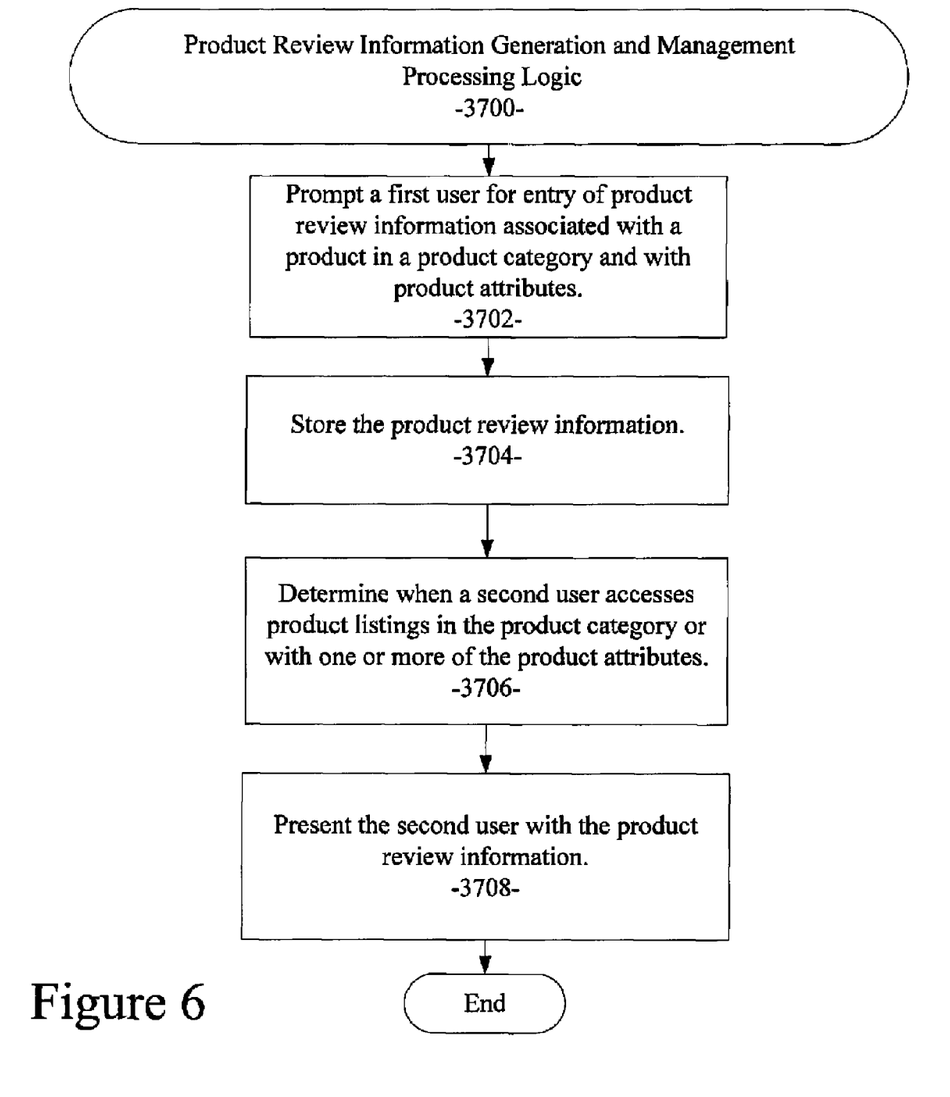
FIG. 6 is a processing flow diagram that illustrates the processing flow in an example embodiment.

FIG. 6 is a processing flow diagram that illustrates the processing flow in an example embodiment. As shown, an example embodiment prompts a first user for entry of product review information associated with a product in a product category and with product attributes; stores the product review information; determines when a second user accesses product listings in the product category or with one or more of the product attributes; and presents the second user with the product review information. It will be apparent to those of ordinary skill in the art that a product review reader could write and add a review of a product themselves.

Figure 7:
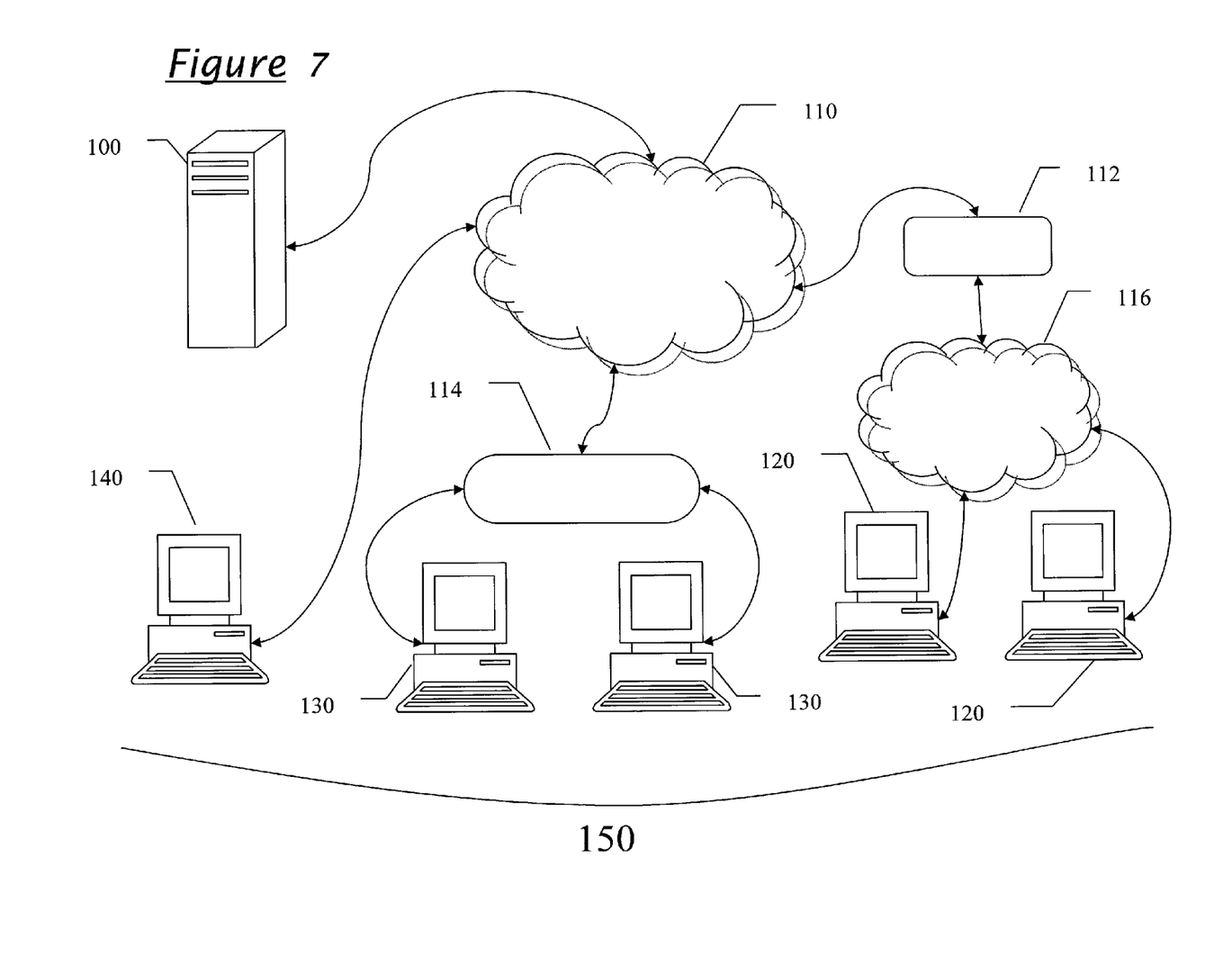
FIG. 7 is a block diagram of a network system on which an embodiment may operate.

Referring now to FIG. 7, a diagram illustrates a network environment in which various example embodiments may operate. In this conventional network architecture, a server computer system 100 is coupled to a wide-area network 110. Wide-area network 110 includes the Internet, or other proprietary networks, which are well known to those of ordinary skill in the art. Wide-area network 110 may include conventional network backbones, long-haul telephone lines, Internet service providers, various levels of network routers, and other conventional means for routing data between computers. Using conventional network protocols, server 100 may communicate through wide-area network 110 to a plurality of client computer systems 120, 130, 140 connected through wide-area network 110 in various ways. For example, client 140 is connected directly to wide-area network 110 through direct or dial-up telephone or other network transmission line. Alternatively, clients 130 may be connected through wide-area network 110 using a modem pool 114. A conventional modem pool 114 allows a plurality of client systems to connect with a smaller set of modems in modem pool 114 for connection through wide-area network 110. In another alternative network topology, wide-area network 110 is connected to a gateway computer 112. Gateway computer 112 is used to route data to clients 120 through a local area network (LAN) 116. In this manner, clients 120 can communicate with each other through local area network 116 or with server 100 through gateway 112 and wide-area network 110.

Using one of a variety of network connection means, server computer 100 can communicate with client computers 150 using conventional means. In a particular implementation of this network configuration, a server computer 100 may operate as a web server if the Internet's World-Wide Web (WWW) is used for wide area network 110. Using the HTTP protocol and the HTML coding language across wide-area network 110, web server 100 may communicate across the World-Wide Web with clients 150. In this configuration, clients 150 use a client application program known as a web browser such as the Internet Explorer™ published by Microsoft Corporation of Redmond, Wash., the user interface of America On-Line™, or the web browser or HTML renderer of any other supplier. Using such conventional browsers and the World-Wide Web, clients 150 may access image, graphical, and textual data provided by web server 100 or they may run Web application software. Conventional means exist by which clients 150 may supply information to web server 100 through the World Wide Web 110 and the web server 100 may return processed data to clients 150.

Figure 8:
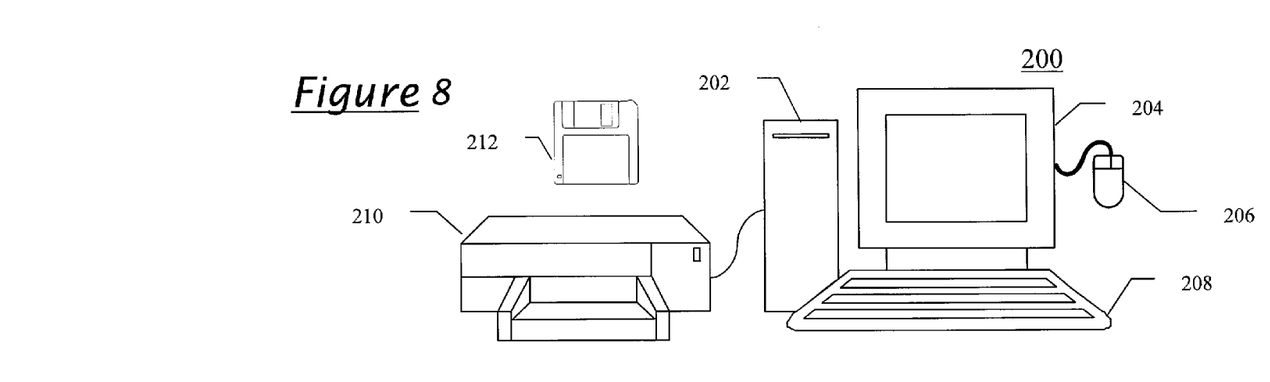
FIGS. 8 and 9 are block diagrams of a computer system on which an embodiment may operate.
Figure 9:
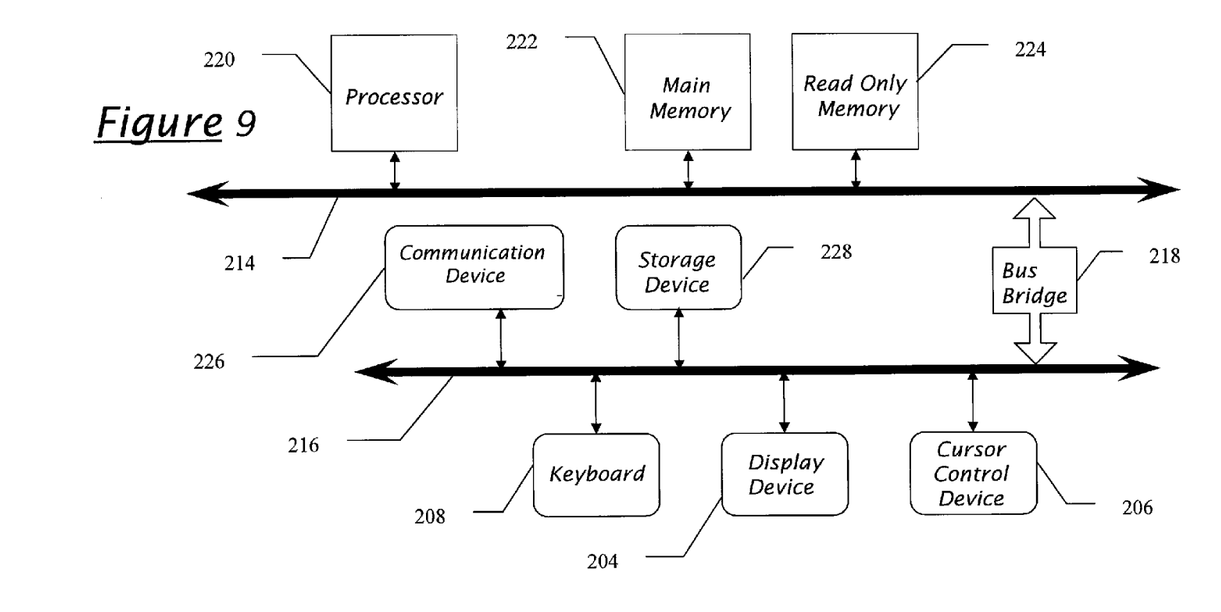

Having briefly described one embodiment of the network environment in which an example embodiment may operate, FIGS. 8 and 9 show an example of a computer system 200 illustrating an exemplary client 150 or server 100 computer system in which the features of an example embodiment may be implemented. Computer system 200 is comprised of a bus or other communications means 214 and 216 for communicating information, and a processing means such as processor 220 coupled with bus 214 for processing information. Computer system 200 further comprises a random access memory (RAM) or other dynamic storage device 222 (commonly referred to as main memory), coupled to bus 214 for storing information and instructions to be executed by processor 220. Main memory 222 also may be used for storing temporary variables or other intermediate information during execution of instructions by processor 220. Computer system 200 also comprises a read only memory (ROM) and/or other static storage device 224 coupled to bus 214 for storing static information and instructions for processor 220.

An optional data storage device 228 such as a magnetic disk or optical disk and its corresponding drive may also be coupled to computer system 200 for storing information and instructions. Computer system 200 can also be coupled via bus 216 to a display device 204, such as a cathode ray tube (CRT) or a liquid crystal display (LCD), for displaying information to a computer user. For example, image, textual, video, or graphical depictions of information may be presented to the user on display device 204. Typically, an alphanumeric input device 208, including alphanumeric and other keys is coupled to bus 216 for communicating information and/or command selections to processor 220. Another type of user input device is cursor control device 206, such as a conventional mouse, trackball, or other type of cursor direction keys for communicating direction information and command selection to processor 220 and for controlling cursor movement on display 204.

Alternatively, the client 150 can be implemented as a network computer or thin client device. Client 150 may also be a laptop or palm-top computing device, such as the Palm Pilot™. Client 150 could also be implemented in a robust cellular telephone, where such devices are currently being used with Internet micro-browsers. Such a network computer or thin client device does not necessarily include all of the devices and features of the above-described exemplary computer system; however, the functionality of an example embodiment or a subset thereof may nevertheless be implemented with such devices.

A communication device 226 is also coupled to bus 216 for accessing remote computers or servers, such as web server 100, or other servers via the Internet, for example. The communication device 226 may include a modem, a network interface card, or other well-known interface devices, such as those used for interfacing with Ethernet, Token-ring, or other types of networks. In any event, in this manner, the computer system 200 may be coupled to a number of servers 100 via a conventional network infrastructure such as the infrastructure illustrated in FIG. 7 and described above.

The system of an example embodiment includes software, information processing hardware, and various processing steps, which will be described below. The features and process steps of example embodiments may be embodied in articles of manufacture as machine or computer executable instructions. The instructions can be used to cause a general purpose or special purpose processor, which is programmed with the instructions to perform the steps of an example embodiment. Alternatively, the features or steps may be performed by specific hardware components that contain hard-wired logic for performing the steps, or by any combination of programmed computer components and custom hardware components. While embodiments are described with reference to the Internet, the method and apparatus described herein is equally applicable to other network infrastructures or other data communications systems.

Various embodiments are described herein. In particular, the use of embodiments with various types and formats of user interface presentations and/or application programming interfaces may be described. It will be apparent to those of ordinary skill in the art that alternative embodiments of the implementations described herein can be employed and still fall within the scope of the claimed invention. In the detail herein, various embodiments are described as implemented in computer-implemented processing logic denoted sometimes herein as the "Software". As described above, however, the claimed invention is not limited to a purely software implementation.

Thus, a system and method for product review information generation and management are disclosed. While the present invention has been described in terms of several example embodiments, those of ordinary skill in the art will recognize that the present invention is not limited to the embodiments described, but can be practiced with modification and alteration within the spirit and scope of the appended claims. The description herein is thus to be regarded as illustrative instead of limiting.

What is claimed is:

1. A method comprising:
   prompting a seller for entry of specific product item information associated with a specific product item offered for sale in a product category and with specific product attributes, the specific product item information being entered in a first user interface section, wherein the seller is one who creates a product listing corresponding to the specific item offered for sale in the product category;
   prompting the seller for entry of product review information associated with the product category using information from the seller's entry of specific product item information, the product review information being entered in a second user interface section different from the first user interface section;
   storing the product review information;
   determining, by use of a processor, when a user accesses product listings in the product category or accesses product listings with one or more of the specific product attributes; and
   presenting an information view to the user, the information view including the product review information associated with the product category and entered by the seller.

2. The method as claimed in claim 1 wherein the information view includes profile information related to the seller.

3. The method as claimed in claim 1 including generating clusters of related product listings in various dimensions.

4. The method as claimed in claim 1 including prompting the user for entry of product review information associated with the product category.

5. An article of manufacture comprising a non-transitory machine-readable storage medium having machine executable instructions embedded thereon, which when executed by a machine, cause the machine to:
   prompt a seller for entry of specific product item information associated with a specific product item offered for sale in a product category and with specific product attributes, the specific product item information being entered in a first user interface section, wherein the seller is one who creates a product listing corresponding to the specific item offered for sale in the product category;
   prompt the seller for entry of product review information associated with the product category using information from the seller's entry of specific product item information, the product review information being entered in a second user interface section different from the first user interface section;
   store the product review information;
   determine when a user accesses product listings in the product category or accesses product listings with one or more of the specific product attributes; and
   present an information view to the user, the information view including the product review information associated with the product category and entered by the seller.

6. The article of manufacture as claimed in claim 5 wherein the information view includes profile information related to the seller.

7. The article of manufacture as claimed in claim 5 being further configured to generate clusters of related product listings in various dimensions.

8. The article of manufacture as claimed in claim 5 being further configured to prompt the user for entry of product review information associated with the product category.

9. A system comprising:
   a processor;
   a memory coupled to the processor to store product review information; and
   a review collector to obtain category-based product review information from a seller, the review collector being configured to prompt the seller for entry of specific product item information associated with a specific product item offered for sale in a product category and with specific product attributes, the specific product item information being entered in a first user interface section, wherein the seller is one who creates a product listing corresponding to the specific item offered for sale in the product category, to prompt the seller for entry of product review information associated with the product category using information from the seller's entry of specific product item information, the product review information being entered in a second user interface section different from the first user interface section, and to store the product review information in the memory; and
   a review presenter being configured to determine when a user accesses product listings in the product category or accesses product listings with one or more of the specific product attributes, and to present an information view to the user, the information view including the product review information associated with the product category and entered by the seller.

10. The system as claimed in claim 9 wherein the information view includes profile information related to the seller.

11. The system as claimed in claim 9 being further configured to generate clusters of related product listings in various dimensions.

12. The system as claimed in claim 9 being further configured to prompt the user for entry of product review information associated with the product category.

* * * * *